United States Patent
Reul et al.

(10) Patent No.: US 6,766,710 B2
(45) Date of Patent: Jul. 27, 2004

(54) HYDRAULIC CONTROL DEVICE FOR OPERATING A SLIDING SELECTOR SHAFT

(75) Inventors: Alexander Reul, Reundorf (DE); Roland Stössel, Oberaurach (DE); Günter Kestler, Schesslitz (DE)

(73) Assignee: FTE automotive GmbH (DE)

( * ) Notice: Subject to any disclaimer, the term of this patent is extended or adjusted under 35 U.S.C. 154(b) by 0 days.

(21) Appl. No.: 09/877,721

(22) Filed: Jun. 8, 2001

(65) Prior Publication Data

US 2002/0020290 A1 Feb. 21, 2002

(30) Foreign Application Priority Data

Jun. 9, 2000 (DE) .......................... 100 28 682

(51) Int. Cl.$^7$ ............................... F16H 61/30
(52) U.S. Cl. ................. 74/473.11; 74/473.36; 74/606 R; 92/248
(58) Field of Search .................... 74/469, 473.11, 74/473.36, 606 R; 92/248–254

(56) References Cited

U.S. PATENT DOCUMENTS

| | | | | |
|---|---|---|---|---|
| 2,727,797 A | * | 12/1955 | Snyder ........................ | 92/249 |
| 3,636,324 A | | 1/1972 | Clark | |
| 3,802,323 A | * | 4/1974 | Suechting ................... | 92/249 |
| 4,205,595 A | * | 6/1980 | Hafner et al. ............... | 92/248 |
| 4,261,216 A | * | 4/1981 | Braun ........................ | 74/335 |
| 4,580,457 A | * | 4/1986 | Ishida et al. ................ | 74/335 |
| 5,113,747 A | * | 5/1992 | Pignerol ..................... | 92/250 |
| 5,676,618 A | * | 10/1997 | Nakano et al. ............. | 476/10 |
| 5,974,907 A | * | 11/1999 | Song ....................... | 74/473.11 |
| 5,992,948 A | * | 11/1999 | Gowda .................... | 303/116.1 |

FOREIGN PATENT DOCUMENTS

| | | |
|---|---|---|
| DE | 23 56 807 C3 | 9/1977 |
| DE | 29 14 624 A1 | 10/1980 |
| DE | 34 10 802 A1 | 10/1984 |
| DE | 42 30 123 A1 | 3/1994 |
| DE | 197 25 226 A1 | 1/1998 |
| GB | 2 045 389 A | 10/1980 |
| WO | WO 99/32810 A1 | 12/1998 |

OTHER PUBLICATIONS

Härtling, "Neuartige PTFE–Komplettkolben Für die Pneumatik". In: Ölhydraulik und Pneuamatik 31, 1987, Nr. 11, Seiten, 835–839.

E. Jacobs, "New Materials For Fluid Power Components". In: Hydraulics & Pneumatics, Jul. 1971, Seiten, pp. 81–85.

K.R. Quinn, G. O'Brien: Thermoplastic Composites for the Hot Jobs. In: Machine Design, Feb., 1988, Seite, pp. 163–167.

* cited by examiner

*Primary Examiner*—William C. Joyce
(74) *Attorney, Agent, or Firm*—McAndrews, Held & Malloy, Ltd.

(57) ABSTRACT

A hydraulic control device operates a sliding selector shaft, in particular a gearbox for motor vehicles, with a bore made in a wall of a gearbox housing for accommodating a plastic piston. The piston is actively connected to the sliding selector shaft and delimits a pressure chamber and, under hydraulic pressure, radially guides and axially displaces the sliding selector shaft. The piston has a body and a guide section consisting of plastic. The piston is guided directly at the bore, designed as a non-reinforced and unlined cylinder bore, in the wall of the gearbox housing, consisting of a light metal alloy. This creates control device, which is of a much simpler, and more compact design compared with prior art.

37 Claims, 4 Drawing Sheets

HYDRAULIC CONTROL DEVICE FOR OPERATING A SLIDING SELECTOR SHAFT

DESCRIPTION OF THE PRIOR ART

The present invention relates to a hydraulic control device for operating a sliding selector shaft. In particular, the invention concerns a hydraulic control device for operating a sliding selector shaft of a gearbox for motor vehicles.

According to prior art, hydraulic control devices for motor vehicle gearboxes are known which have a control cylinder which serves to operate and position a selector fork attached to a sliding selector shaft of the gearbox for a gear shift. Traditionally, these control cylinders have a metal cylinder housing, which is bolted to the gearbox housing, today usually made from a light metal alloy, via a flange. At least one metal piston is disposed in the cylinder bore of the cylinder housing so that it can move axially and is actively connected to the sliding selector shaft to displace it when the control cylinder is supplied with hydraulic fluid.

In order to simplify this design, DE-A-34 10 802 suggests a control device for change gears of commercial vehicles where the ends of a sliding selector shaft which, for reasons of mechanical strength, is metal, and which carries a shift fork, are mounted in two guides in the form of a pressure medium cylinder, which can form part of the gearbox housing. In this case, the two ends of the sliding selector shaft serve as piston surfaces of equal size via which the sliding selector shaft can be exposed to the pressure medium in order to displace the sliding selector shaft, i.e. with this prior art, the sliding selector shaft itself is designed as a piston whose surfaces of equal size can be exposed to a pressure medium from opposite sides. One disadvantage of this prior construction is that the guides formed in opposite walls of the gearbox housing have to align with each other exactly, which involves a complicated manufacturing process, so that the singe piece sliding selector shaft in the form of a piston cannot jam in the guides when it makes its longitudinal movement.

In addition, bearing and guide systems for supporting the longitudinal movement of sliding selector shafts for vehicle gearboxes are known (Looman, Johannes: Toothed Gearing: Basic Principles, Designs, Applications in Vehicles; 3rd edition; Springer-Verlag 1996; Page 154, FIG. 6–10), which have bearing units disposed on both sides of the selector shaft and fork. These bearing units are two-part units and consist of a thin-walled sleeve with mounting trough and also an inside race sleeve with ball. The first sleeve, drawn from steel strip and case hardened, is used to line a corresponding bore in a wall of the gearbox housing, whereas the resilient internal race sleeve is allocated to the end of the selector shaft and fork. With a radial, essentially play-free guide, the bearing units do bring about a slight axial displaceability of the selector shaft and fork, but this requires considerable expense in terms of the fixture used.

Finally, the generic DE-A-197 25 226 discloses a piston-cylinder arrangement for the selector shaft and fork of a gearbox where pistons, which can consist of plastic, are disposed on the right and left end of the selector shaft and fork. Each piston is inserted into a cylinder pot which has an outside threaded section. The outside threaded section of the cylinder pot is screwed into an inside threaded section of a through or blind hole of the gearbox or clutch housing wall and has an element for damping the piston stop on the bottom. With this prior construction, the piston stop can be adjusted by turning the cylinder pot in the threaded hole of the gearbox or coupling housing wall. However, the design of the threaded sections demands in particular considerable production expense which increases the manufacturing in an undesirable way for the mass production of gearboxes for motor vehicles.

SUMMARY OF THE INVENTION

An object of the invention is to create a simpler and more compact hydraulic control device for operating a sliding selector shaft compared with prior art.

According to the present invention, there is provided a hydraulic control device for operating a sliding selector shaft, in particular of a gearbox for motor vehicles, with a bore made in a wall of a gearbox housing to accommodate a plastic piston actively connected to the sliding selector shaft, which delimits a pressure chamber and which, under hydraulic pressure, radially guides and axially displaces the sliding selector shaft, wherein the piston has a body and a plastic guide section via which the piston is guided directly on the bore, the bore being made as a non-reinforced cylinder bore in the wall of the gearbox and wherein the gearbox is made of a light metal alloy.

Consequently, the piston is used advantageously both for the displacement and for the defined guiding or bearing of the sliding selector shaft without additional expensive bearing parts, like race sleeves with ball rings or similar being necessary. What is more, a space-consuming separate cylinder housing is no longer necessary, because the cylinder bore guiding the piston is made directly in a wall of a gearbox consisting of a light metal alloy, in particular an aluminum or magnesium alloy. Finally, expensive linings of the cylinder bore, possibly using steel sleeves or similar, can be omitted, because surprisingly, it has been found that under the given conditions, namely hydraulic system pressures of between 20 and 40 bar and ambient temperatures of more than 120° C. in the oil mist in some instances, the piston pair with guide section in plastic and cylinder bore in light metal alloy, with good wear behavior and also an adequate self-lubricating and venting property, guarantees the necessary guide properties. As a result, not inconsiderable space, weight and cost savings can be achieved with the embodiment of the control device according to the invention compared with traditional control device designs, which allows the use of such control devices in volume series.

The guide section of the piston can be made as one piece with the body in an advantageous manner from the manufacturing point of view. However, it is also possible that the guide section of the piston is formed by a guide ring disposed on a guide seat of the body.

The guide ring of the piston can be attached positively to the guide seat in an advantageously simple manner, i.e. without additional fastening means such as adhesive or similar. To do this, the piston can be provided with a collar formed on the piston body and at least one projection projecting slightly from the body in the radial direction, the guide ring being disposed between the collar and the projection on the guide seat of the body. To fit the sleeve shaped guide ring, this has to be pushed onto the body in a simple manner from the side of the body facing away from the collar and in the direction of the collar, with a slight partial expansion at the projection. A further positive connection can be made between the guide ring and the body which is favourable from the manufacturing point of view. According to this, the guide seat of the body is provided with a profile, possibly several radial grooves disposed next to each other, onto which the guide ring is rolled, the guide ring, in the form of an annular disc initially being transformed into a sleeve, the inside perimeter surface of which more or less presses into the profiling of the body.

If the guide section of the piston is integral with the body, fiber-reinforced polyphthalamide (PPA) or polyphenyl sulphide (PPS) have proved advantageous as a material for the body of the piston, particularly from the point of view of good abrasion resistance. If the guide section of the piston is formed by a guide ring disposed on the guide seat of the body, the body of the piston should preferably consist of long fiber-reinforced polyamide (PA) in a cost-effective manner. With reference to the good guide properties and good wear behavior, it is advantageous if polyphthalamide (PPA) or polyphenyl sulphide (PPS) is used as the material for the guide ring.

In the case of the piston embodiments described above in particular (integral body and guide section in PPA or PPS or body in PA and guide ring in PPA or PPS), the body preferably has a radial groove or a shoulder on the side of the guide section facing the pressure chamber in which or on which a known grooved ring is disposed whose dynamic sealing lip is facing away from the pressure chamber, i.e. which is disposed in a function position which is the reverse of the normal position. This has the advantage that the cylinder bore in the wall of the gearbox does not have to be tightly toleranced and therefore can be made cost effectively. Existing gap dimensions between the cylinder bore and the piston are then bridged by the dynamic sealing lip of the grooved ring. Consequently, in the non-actuated, pressureless state of the control device, the sealing ring prevents the hydraulic fluid from leaking out of the pressure chamber, while depending on the pre-tension of the dynamic sealing lip in the sump mode, when the gearbox oil also serves as the hydraulic medium for the control device and from there can drain off directly into the gearbox trough as leakage or recirculation fluid, it allows a defined leakage with an additional lubricating effect and permanent self-venting of the control device.

The body of the piston can be made cost effectively from polyamide (PA), whereas the material used for the guide ring is polytetrafluoroethylene (PTFE); investigations by the applicant have produced the surprising result that the effects as described above can also be achieved in an advantageous manner even without a grooved ring. In this case, the guide ring consisting of PTFE can take on both a guide and a sealing function in the generously toleranced cylinder bore, which is advantageous from the manufacturing point of view. When operating under hydraulic pressures of up to 40 bar and at operating temperatures of up to more than 120° C., the guide ring then automatically compensates for any excessive play between piston and cylinder bore by volume change or upsetting.

The body can have a radial groove on one end into which a plastic ring is inserted, the outside perimeter of which is provided with several supporting projections interacting with the cylinder bore. The plastic ring serves advantageously as a fitting aid, which, when the gearbox is being installed, prevents the sliding selector shaft, actively connected to the piston inserted into the corresponding cylinder bore of a first gearbox housing part, and which, when the gearbox is being installed, is upright, i.e. extends in the vertical direction, from tilting out of the longitudinal axis of the cylinder bore in an undesirable manner because of its uneven form. Consequently, when joining a further gearbox housing part to the first gearbox housing part, the piston provided on the opposite end of the sliding selector shaft no longer has to be aligned by hand and inserted into the corresponding cylinder bore of the further gearbox housing part. Also, the plastic ring prevents an excessive one-sided loading of the guide section of the piston and of the grooved ring provided on the piston where appropriate. The above effects during installation or operation can be further supported if the body has a collar on the other end, the outside perimeter of which is provided with several supporting projections interacting with the cylinder bore. This embodiment of the control device also has the advantage that jamming, wedging or one-sided upsetting of the guide ring, consisting of PTFE in particular, is reliably avoided in the initial stage, until the guide ring has achieved the volume change or uniform upsetting in operation as mentioned above and therefore takes on a greater supporting function with improved sealing effect.

The sliding selector shaft can be connected to the piston by means of a simple clip connection, which assists a cost-effective and easy installation of the control device. In this case, it is practical for the piston to be provided with a recess for accommodating one end of the sliding selector shaft and to have at the start of the recess at least one lug that is engaged in a corresponding depression of the sliding selector shaft.

The body of the piston can be injection molded as a single plastic part, which guarantees cost-effective manufacture without the need for further processing.

BRIEF DESCRIPTION OF THE DRAWINGS

The invention is explained below in more detail on the basis of preferred embodiments with reference to the attached drawing, where.

DESCRIPTION OF THE PREFERRED EMBODIMENTS

Figure 1:
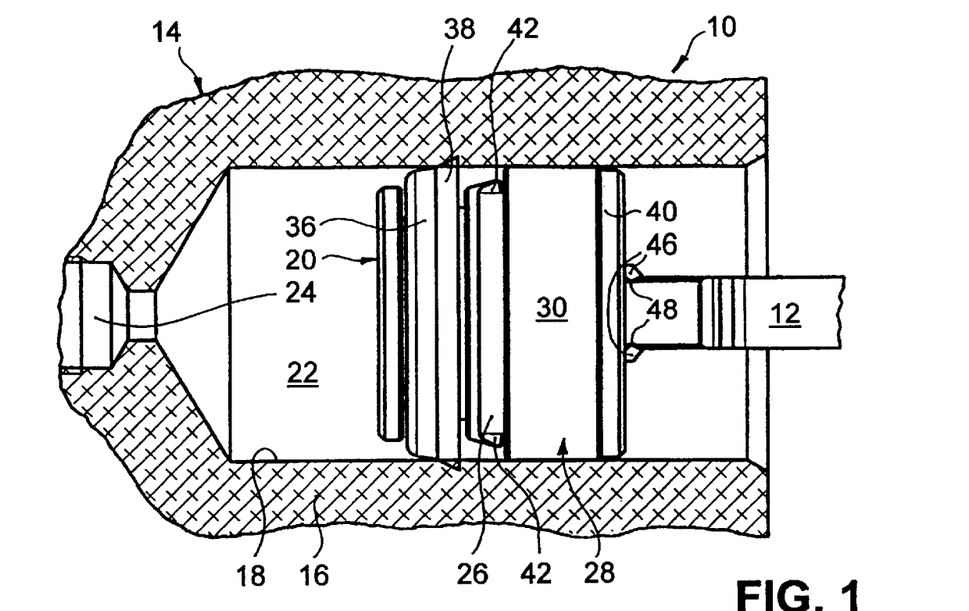
FIG. 1 is a truncated longitudinal section view of a control device according to the invention and according to a first example embodiment with a piston disposed in a cylinder bore which is not shown as a section.
Figure 2:
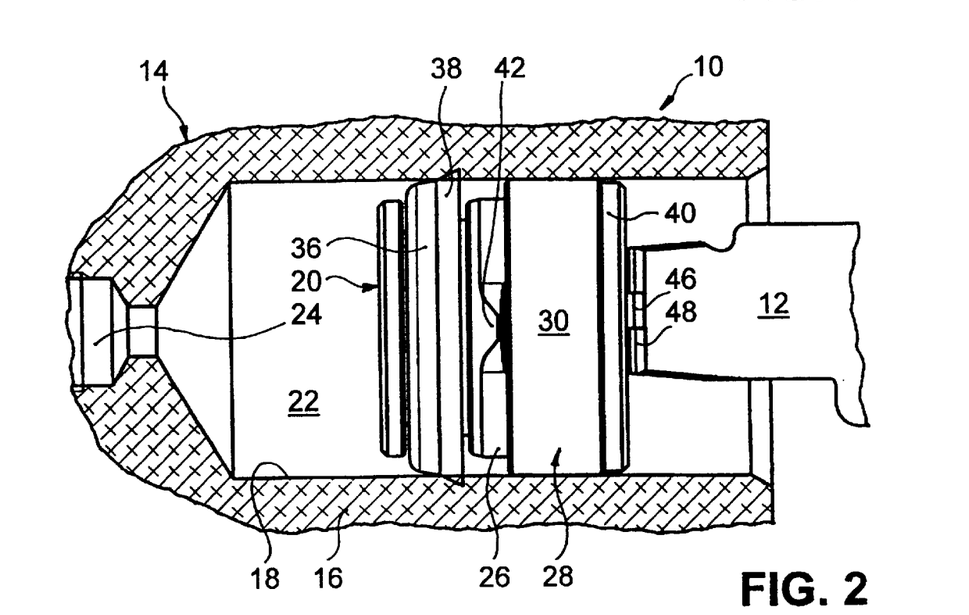
FIG. 2 is a truncated longitudinal section view of the control device according to FIG. 1, when the section plane is turned 90° around the longitudinal axis of the piston in relation to the section plane in FIG. 1.
Figure 3:
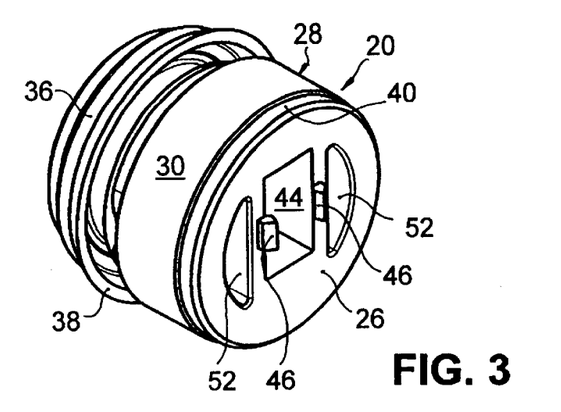
FIG. 3 is a perspective view of the piston of the control device according to FIG. 1 with grooved ring and guide ring disposed on the body.
Figure 4:
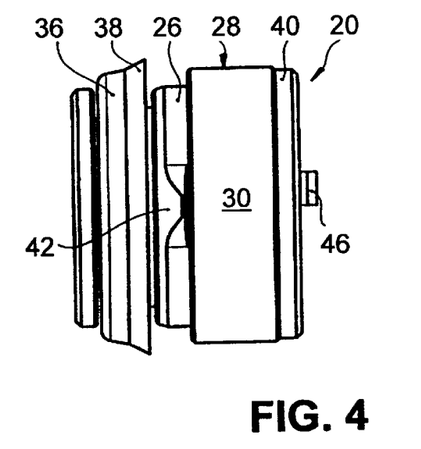
FIG. 4 is a side view of the piston according to FIG. 3.
Figure 5:
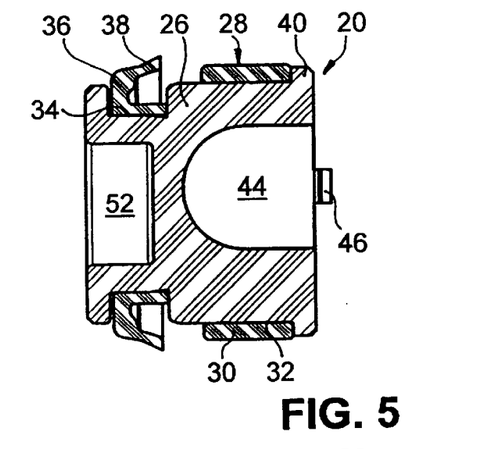
FIG. 5 is a longitudinal section view of the piston according to FIG. 4.
Figure 6:
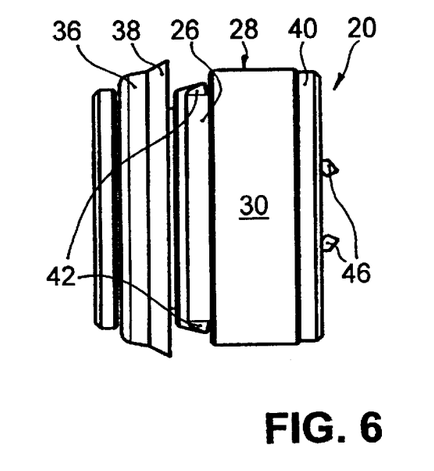
FIG. 6 is a side view of the piston according to FIG. 3, which is turned 90° around its longitudinal axis compared with the view in FIG. 4.
Figure 7:
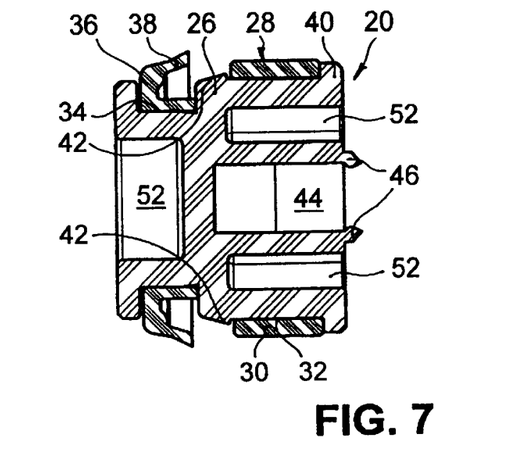
FIG. 7 is a longitudinal section view of the piston according to FIG. 6.
Figure 8:
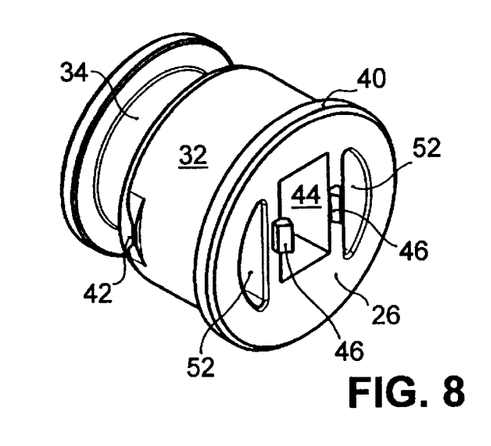
FIG. 8 is a perspective representation of the body of the piston according to FIG. 3 without grooved ring and without guide ring.
Figure 9:
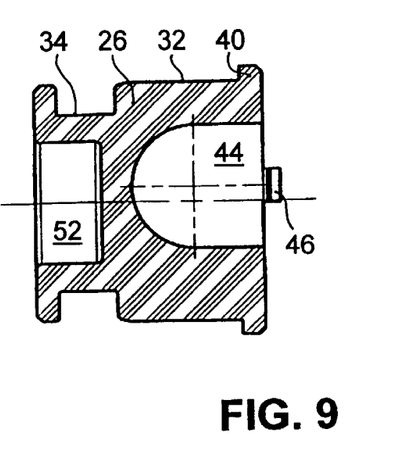
FIG. 9 is a longitudinal section view of the body according to FIG. 8.

FIGS. 1 and 2 show a hydraulic control device 10 for operating a sliding selector shaft 12 of a gearbox for motor vehicles, which has a gearbox housing 14 consisting of a light metal alloy such as an aluminum or magnesium alloy, of which only one wall 16 is illustrated. Wall 16 has a cylinder bore 18, made by a cutting removing production process, e.g. drilling or milling, which is not reinforced, i.e. has no further reinforcement or lining in the form of a bush, sleeve or similar. A plastic piston 20, described in more detail below, is disposed in the cylinder bore 18 and is actively connected to the sliding selector shaft 12, in a manner also to be described, and which, radially guides and axially displaces the sliding selector shaft 12 under hydraulic pressure.

The sliding selector shaft 12 is an easy to manufacture metal stamping, of which only one end is illustrated in FIGS. 1 and 2. The other end of the sliding selector shaft 12 that is not shown is also actively connected to a piston of an opposite-handed control device for engine braking. The sliding selector shaft 12 also has a selector fork (not illustrated) and can be moved to the left or to the right for a gear shift of the gearbox by means of the control devices at the end or from a middle position mechanically locked in a known way.

The cylinder bore 18, in the form of a cylindrical blind bore, delimits a pressure chamber for the hydraulic pressurizing of piston 20, on the left-hand side of the piston in FIGS. 1 and 2. The pressure chamber 22 is connected to a pressure medium supply (not illustrated) at the left-hand end of the cylinder bore in FIGS. 1 and 2 via a pressure medium connection 24 with the intermediate connection of a valve mechanism (not illustrated). The gearbox oil is preferably used as the pressure medium so that the control device 10 can operate in the sump mode, when the leakage or recirculation oil can drain from the control device 10 directly back to the gearbox trough again (not illustrated) both via the pressure medium connection 24 and via the outside perimeter of the piston 20.

Piston 20, which brings about both the axial displacement of the sliding selector shaft 12 and the radial guiding or bearing of the sliding selector shaft 12, i.e. also absorption of the transverse forces, is now accommodated with slight radial play in the cylinder bore 18. The piston 20 illustrated in more detail in FIGS. 3 to 13 has, in the embodiment illustrated, a one-piece injection molded plastic body 26 and a guide section 28, whose diameter is slightly bigger than the diameter of body 26, as FIGS. 4 through 7 illustrate in particular. The cylindrical guide section 28 on the outside perimeter can be made as an integral part of the body 26 as a shoulder projecting radially from the rest of the body 26, but in the example embodiment illustrated, is formed by a closed, sleeve or tubular shaped guide ring 30 in plastic, which is disposed at or on a cylindrical guide seat 32 of the body 26 and secured there preferably positively in a manner to be described.

On the side of the guide section 28 facing the pressure chamber 22 in the installed state of the piston 20, the body 26 also has a radial groove 34 in which a conventional—and therefore not further detailed—grooved ring 36 is disposed. As can be clearly seen from FIGS. 1 and 2, which, for the sake of simplicity, illustrate the grooved ring 36 in the undeformed state, the dynamic sealing lip 38 of the grooved ring faces away from the pressure chamber 22, i.e. the grooved ring 36 is disposed in the radial groove 34 in a function position which is the reverse of the normal position.

In the example embodiment illustrated, for the purpose of the positive connection of the guide ring 30 to the guide seat 32 on the right-hand side of the guide ring 30 in FIGS. 1, 2, 4 through 7, 9 and 10, an annular collar 40, the diameter of which is smaller than the outside diameter of the guide ring 30, is provided on body 26, on which the guide ring 30 can support itself and which terminates the body 26 to the right. On the opposite side of the guide ring 30, i.e. the left side in the drawings mentioned, the body 26 is provided with projections or lugs 42 projecting slightly from the body 26 in the radial direction. The two projections 42 disposed diametrically opposite in the embodiment example illustrated hold the guide ring 30 in contact with the annual collar 40 and are slightly beveled towards the radial groove 34 of the body 26 in order to facilitate the fitting or pushing on of the guide ring 30 on the guide seat 32.

In a positive fixing alternative not illustrated, the guide seat can also be provided with a profile, possibly a number of adjacent annular grooves, onto which the guide ring is rolled, instead of the annular collar and the projections. In this case, the guide ring is initially in the shape of a annular disc and receives its sleeve-type form by deformation during the rolling process, its inside perimeter surface being positively engaged with the profile of the guide seat as the result of the pressure applied and at a temperature above ambient temperature.

Figure 10:
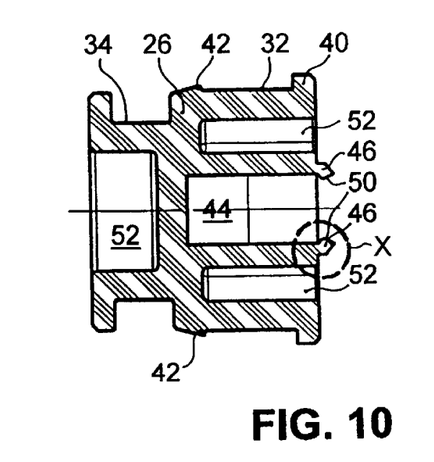
FIG. 10 is a longitudinal section view of the body according to FIG. 8, when the section plane is turned 90° around the longitudinal axis of the body compared with the section plane in FIG. 9.
Figure 11:
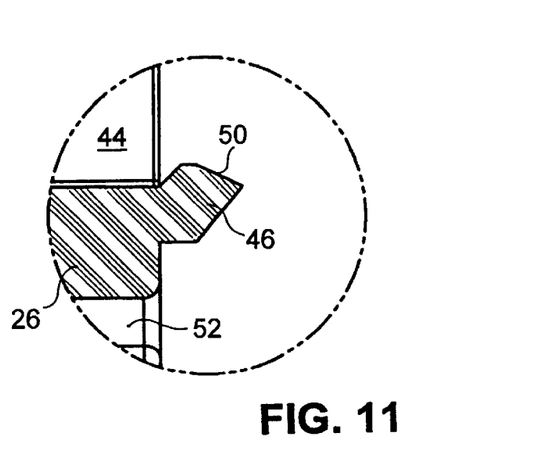
FIG. 11 is an enlarged view of detail X in FIG. 10.
Figure 12:
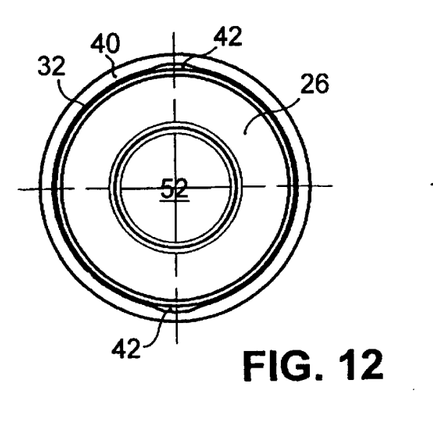
FIG. 12 is a view of the body from the left in FIG. 10.
Figure 13:
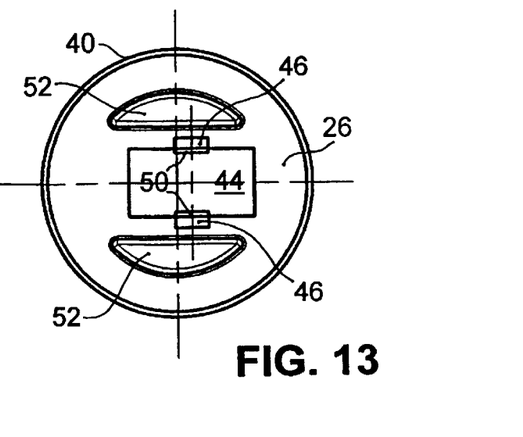
FIG. 13 is a view of the body from the right in FIG. 10.

In the embodiment example illustrated, the active connection between the sliding selector shaft 12 and the piston 20 is made with a clip connection. In this case, the body 26 of the piston 20 is provided with a recess 44 of rectangular cross-section on its side facing away from the pressure chamber 22 in which one end of the sliding selector shaft 12 is accommodated with slight play. At the beginning of the recess 44, lugs 46 are formed integrally with the body 26 on both sides of the recess 44, which project radially inwards from the body 26 and, according to FIG. 2, are engaged in a corresponding groove-type recess 48 of selector sliding shaft 12. As FIGS. 10 and 11 illustrate in particular, the lugs 46 on the sides facing each other are provided with a joining bevel 50 in order to facilitate the axial joining of sliding selector shaft 12 and piston 20.

Finally, it is pointed out with reference to body 26 of the piston 20, that at the transitions of its individual areas, the body 26 is provided completely with chamfers and curves which are partly the result of the production process and facilitate handling of the piston 20. The body 26 also has other recesses 52 starting from its ends which help to reduce the weight and, from the point of view of production engineering, prevent shrinkage, collapse and distortion of the body 26 by essentially forming the same wall thicknesses.

It has already been mentioned at the beginning that the body 26 of the piston 20 can consist either of a preferably long fiber reinforced polyamide (PE) or a fiber reinforced, partly crystalline high performance polymer based on polyphthalamide (PPA) or polyphenyl sulphide (PPS). In the case of piston variants where the body 26 and guide section 28 are integral, PPA or PPS are a suitable piston material. On the other hand, in the case of piston variants where the guide section 28 is formed by a guide ring 30, the body 26 should preferably consist of PA mainly for cost reasons. The material of the guide ring 30 can then be either a polytetrafluoroethylene (PTFE) base material or again PPA or PPS. If PTFE is used as the material for guide ring 30, it is possible in principle to omit the grooved ring 36 described above. With the fastening variant referred to above, according to which the guide ring is rolled onto a profile of the guide seat on the body, the body finally should preferably consist of PPA or PPS, whereas PTFE is a suitable material for the guide ring. According to the functional requirements concerned, a sealing lip can also be formed on the PTFE guide ring by means of the rolling process.

It is obvious to a person skilled in the art that other variations and modifications of the piston described in particular are possible. For example, with a suitable material, the body of the piston can also be provided with an integrally molded-on lip instead of with a radial groove and grooved ring, which faces away from the pressure chamber in order to prevent a leakage of hydraulic fluid when the piston is stationary. Although not shown in the illustrations, the piston can also be provided with an integrated sensor, which allows an electronically controlled approach to the required position of the sliding selector shaft. Finally, the control device is also conceivable in principle with a double-acting piston, i.e. which can be pressurized on the one side or the other or both sides, which is positioned on one end of the sliding selector shaft, whereas only a sliding bearing is provided on the other end of the sliding selector shaft. In that case, special measures to bridge gap dimensions between cylinder bore and piston would not have to be taken. However, it would have to be ensured that if both sides of the piston are pressurized, so that the piston is centered, a pressure-free drainage of the hydraulic fluid to the gearbox sump is guaranteed.

Regarding the cylinder bore 18/piston 20 running pair, it is pointed out here that the cylinder bore 18 can be made without further processing. For example, it is not necessary in principle to smooth the cylinder bore 18 after it has been made using a drill or milling cutter, for example. An average roughness depth Rz according to DIN 4768 of approximately 12 μm is adequate here. A surface hardness treatment of the running surface of the cylinder bore 18 is also unnecessary in principle, because in the application described, a slight leakage via the piston 20 is permitted (sump operation), i.e. there is no seal in the traditional sense by means of a sealing element, so that in this respect no surface measures are needed to prevent abrasion on the running surface of the cylinder bore 18.

With reference to the fit play between cylinder bore 18 and piston 20, it is pointed out that in view of the permitted leakage, this must be formulated with adequate guide properties. In this case, the relevant characteristic values of the plastic for the piston 20 and the guide ring 30 must be taken into account and also the swelling values in the hydraulic medium, the absorption of water from the ambient air and thermal expansion at operating temperature. It has been found that taking these characteristic values into account, the initial outside diameter of the guide section 28 of the piston 20, i.e. the outside diameter of the guide section 28 of the piston 20, should be approximately 5% to 10% smaller than the nominal diameter of the cylinder bore 18 at the time when the control device 10 is fitted and at ambient temperature. This thereby pre-determined initial fit play will decrease even further in time with the operation of the hydraulic control device 10, because, as already mentioned at the beginning, the guide section 28 of the piston 20 also undergoes plastic deformation (upsetting and expansion) under the prevailing operating pressures and temperatures, as a result of which the sealing effect here is also improved.

FIGS. 14 to 17 show details of piston 20 of a second embodiment of the hydraulic control device 10, which will only be described below in respect of those features that differ from the first example embodiment.

Figures 14, 15, 16, 17:
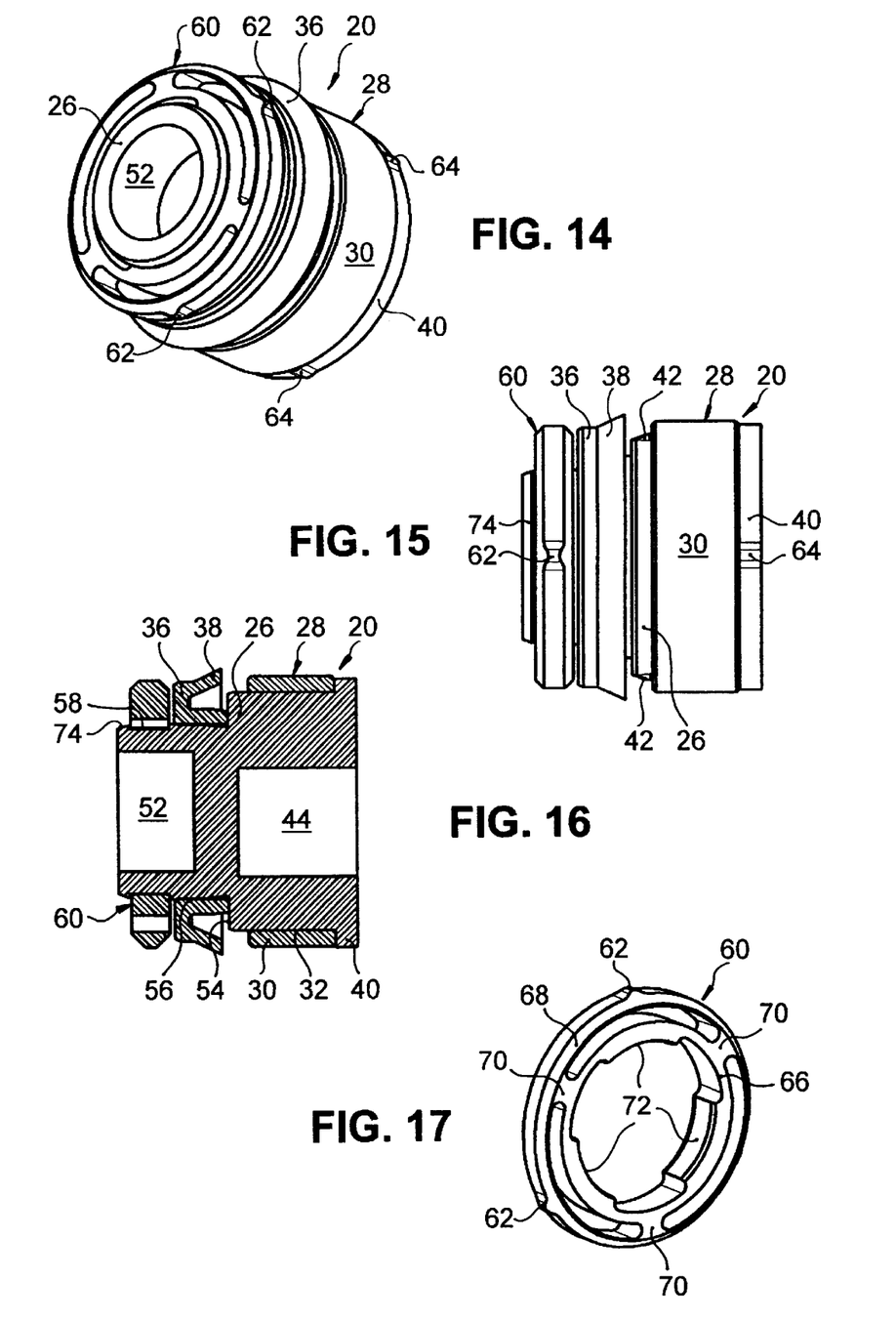
FIG. 14 is a perspective representation of a piston of a control device according to the invention and according to the second embodiment example.
FIG. 15 is a side view of the piston according to FIG. 14.
FIG. 16 is a longitudinal section view of the piston according to FIG. 14.
FIG. 17 is a perspective view of a plastic ring that can be clipped onto the piston according to FIG. 14.

As can be seen from FIG. 16 in particular, in the case of this embodiment, the body 26 of the piston 20 has a shoulder 56 of smaller diameter following the guide seat 32 for the guide ring 30 via an annular shoulder 54, on which the grooved ring 36 is disposed. The end of shoulder 56 of the body 26 which faces the pressure chamber 22 in the installed state of the piston 20 is provided with a radial groove 58 into which a preferably injection molded plastic ring, illustrated separately in FIG. 17, is inserted. In this way, the grooved ring 36 is held on the shoulder 56 of the piston body 26 between the plastic ring 60 and the annular shoulder 54.

As is best illustrated in FIGS. 14, 15 and 17, the outside perimeter of the plastic ring 60 is provided with a number of supporting projections 62—in the embodiment illustrated, three supporting projections 62 uniformly distributed on the perimeter—the tips of which lie on a circle, whose diameter more or less corresponds to the initial outside diameter of the guide ring 30 or is slightly bigger than this. In the same way, the outside perimeter of the collar 40 on the other end of the body 26 is provided with a number of supporting projections 64—in the embodiment illustrated, three supporting projections 64 uniformly distributed on the perimeter—whose tips also lie on a circle, whose diameter more or less corresponds to the initial outside diameter of the guide ring 30 or is slightly bigger than this. It can be seen that the supporting projections 62, 64 interacting with the cylinder bore 18 in the installed state of the piston 20 reliably prevent a tilting or jamming of the piston 20 and therefore also an excessive one-sided deformation of the guide ring 30 and of the grooved ring 36. In addition, the supporting projections 62, 64 serve as a fitting aid, as already described at the beginning.

According to FIG. 17 in particular, the plastic ring 60 has an inner circular section 66 and an outer circular section 68 that are inter-connected via web 70. In the example embodiment illustrated, three webs 70, uniformly distributed over the perimeter, are provided. Seen in the direction of the perimeter, between the webs 70, three arc segment-shaped projections 72, uniformly distributed over the perimeter, are formed on the inside perimeter of the inner circular section 66. Projections 72 define a cylinder surface on the inside perimeter side, whose diameter more or less corresponds to the outside diameter at the base of the radial groove 58 in the shoulder 56 of the piston body 26. It can be seen that if, for fitting on the body 26, the plastic ring is pushed onto the shoulder 56 via a conical joining section 74 illustrated in FIGS. 15 and 16, the projections 72 can initially spring outwards radially in order to engage in the radial groove 58 in the shoulder 56 and to attach the plastic ring 60 to the body 26 in the manner of a clip connection.

Although it has been described above that the plastic ring 60 is provided on the end of the piston body 26 facing the pressure chamber 22 in the installed state of the piston 20, whereas the collar 40 is located on the end of the body 26 facing away from the pressure chamber 22, the arrangement of the collar 40 and the plastic ring 60 can also be reversed. The same also applies to the guide ring 30 and the grooved ring 36, i.e. the guide ring 30 can also be disposed on the end of the body 26 facing the pressure chamber 22, whereas the grooved ring 36, fitted in the opposite way to the normal function position, is located on the end of the body 26 facing away from the pressure chamber 22.

We claim:

1. A motor vehicle gearbox with:
    a gearbox housing made of a light metal alloy;
    a sliding selector shaft; and
    a hydraulic control device for operating said sliding selector shaft, said control device comprising a bore made as a non-reinforced cylinder bore in a wall of said gearbox housing, and a plastic piston accommodated in said bore and actively connected to said sliding selector shaft, which piston delimits a pressure chamber and, under hydraulic pressure, radially guides and axially displaces said sliding selector shaft;
    wherein said piston has a body and a plastic guide section via which said piston is guided directly on said bore, said guide section being integral with said body, and said body consisting of a fiber reinforced polyphthalamide (PPA).

2. A motor vehicle gearbox according to claim 1, wherein, on the side of said guide section facing said pressure chamber, said body has a radial groove or a shoulder in or on which a packing ring having a dynamic sealing lip is disposed, said dynamic sealing lip facing away from said pressure chamber.

3. A motor vehicle gearbox according to claim 1, wherein said piston body has one end, said one end having a radial groove into which a plastic ring is inserted, said plastic ring having an outside perimeter which is provided with a plurality of supporting projections interacting with said cylinder bore.

4. A motor vehicle gearbox according to claim 3, wherein said piston body has a second end, said second end having a collar with an outside perimeter which is provided with a plurality of supporting projections interacting with said cylinder bore.

5. A motor vehicle gearbox according to claim 1, wherein said sliding selector shaft is connected to said piston via a clip connection.

6. A motor vehicle gearbox according to claim 5, wherein said piston is provided with a recess to accommodate one end of said sliding selector shaft and has at least one lug at the beginning of said recess, which is engaged in a corresponding recess of said sliding selector shaft.

7. A motor vehicle gearbox according to claim 1, wherein said body is an integral injection molding in plastic.

8. A motor vehicle gearbox with:
    a gearbox housing made of a light metal alloy;
    a sliding selector shaft; and
    a hydraulic control device for operating said sliding selector shaft, said control device comprising a bore made as a non-reinforced cylinder bore in a wall of said gearbox housing, and a plastic piston accommodated in said bore and actively connected to said sliding selector shaft, which piston delimits a pressure chamber and, under hydraulic pressure, radially guides and axially displaces said sliding selector shaft;
    wherein said piston has a body and a plastic guide section via which said piston is guided directly on said bore, said body having a guide seat, and said guide section being formed by a guide ring disposed on said guide seat, wherein said body consists of polyamide (PA), whereas the material of said guide ring is polyphthalamide (PPA) or polyphenylene sulphide (PPS).

9. A motor vehicle gearbox according to claim 8, wherein said guide ring is positively connected to said guide seat.

10. A motor vehicle gearbox according to claim 9, wherein said body has a collar formed on it and at least one projection projecting from said body in the radial direction and wherein said guide ring is disposed on said guide seat between said collar and said at least one projection.

11. A motor vehicle gearbox according to claim 9, wherein said guide seat is provided with a profile onto which said guide ring is rolled.

12. A motor vehicle gearbox according to claim 8, wherein, on the side of said guide section facing said pressure chamber, said body has a radial groove or a shoulder in or on which a packing ring having a dynamic sealing lip is disposed, said dynamic sealing lip facing away from said pressure chamber.

13. A motor vehicle gearbox according to claim 8, wherein said piston body has one end, said one end having a radial groove into which a plastic ring is inserted, said plastic ring having an outside perimeter which is provided with a plurality of supporting projections interacting with said cylinder bore.

14. A motor vehicle gearbox according to claim 13, wherein said piston body has a second end, said second end having a collar with an outside perimeter which is provided with a plurality of supporting projections interacting with said cylinder bore.

15. A motor vehicle gearbox according to claim 8, wherein said sliding selector shaft is connected to said piston via a clip connection.

16. A motor vehicle gearbox according to claim 15, wherein said piston is provided with a recess to accommodate one end of said sliding selector shaft and has at least one lug at the beginning of said recess, which is engaged in a corresponding recess of said sliding selector shaft.

17. A motor vehicle gearbox according to claim 8, wherein said body is an integral injection molding in plastic.

18. A motor vehicle gearbox with:
    a gearbox housing made of a light metal alloy;
    a sliding selector shaft; and
    a hydraulic control device for operating said sliding selector shaft, said control device comprising a bore made as a non-reinforced cylinder bore in a wall of said gearbox housing, and a plastic piston accommodated in said bore and actively connected to said sliding selector shaft, which piston delimits a pressure chamber and, under hydraulic pressure, radially guides and axially displaces said sliding selector shaft;
    wherein said piston has a body and a plastic guide section via which said piston is guided directly on said bore, wherein, on the side of said guide section facing said pressure chamber, said body has a radial groove or a shoulder in or on which a packing ring having a dynamic sealing lip is disposed, said dynamic sealing lip facing away from said pressure chamber.

19. A motor vehicle gearbox according to claim 18, wherein said guide section is integral with said body.

20. A motor vehicle gearbox according to claim 19, wherein said body consists of a fiber reinforced polyphthalamide (PPA) or polyphenylene sulphide (PPS).

21. A motor vehicle gearbox according to claim 18, wherein said body has a guide seat, said guide section being formed by a guide ring disposed on said guide seat.

22. A motor vehicle gearbox according to claim 21, wherein said guide ring is positively connected to said guide seat.

23. A motor vehicle gearbox according to claim 22, wherein said body has a collar formed on it and at least one projection projecting from said body in the radial direction and wherein said guide ring is disposed on said guide seat between said collar and said at least one projection.

24. A motor vehicle gearbox according to claim 22, wherein said guide seat is provided with a profile onto which said guide ring is rolled.

25. A motor vehicle gearbox according to claim 21, wherein said body consists of polyamide (PA), whereas the material of said guide ring is polyphthalamide (PPA) or polyphenylene sulphide (PPS).

26. A motor vehicle gearbox according to claim 21, wherein said body consists of polyamide (PA), whereas the material of said guide ring is polytetrafluoroethylene (PTFE).

27. A motor vehicle gearbox according to claim 18, wherein said piston body has one end, said one end having a radial groove into which a plastic ring is inserted, said plastic ring having an outside perimeter which is provided with a plurality of supporting projections interacting with said cylinder bore.

28. A motor vehicle gearbox according to claim 27, wherein said piston body has a second end, said second end having a collar with an outside perimeter which is provided with a plurality of supporting projections interacting with said cylinder bore.

29. A motor vehicle gearbox according to claim 18, wherein said sliding selector shaft is connected to said piston via a clip connection.

30. A motor vehicle gearbox according to claim 29, wherein said piston is provided with a recess to accommodate one end of said sliding selector shaft and has at least one lug at the beginning of said recess, which is engaged in a corresponding recess of said sliding selector shaft.

31. A motor vehicle gearbox according to claim 18, wherein said body is an integral injection molding in plastic.

32. A motor vehicle gearbox with:

a gearbox housing made of a light metal alloy;

a sliding selector shaft; and a hydraulic control device for operating said sliding selector shaft, said control device comprising a bore made as a non-reinforced cylinder bore in a wall of said gearbox housing, and a plastic piston accommodated in said bore and actively connected to said sliding selector shaft, which piston delimits a pressure chamber and, under hydraulic pressure, radially guides and axially displaces said sliding selector shaft;

wherein said piston has a body and a plastic guide section via which said piston is guided directly on said bore, said guide section being integral with said body, and said body consisting of a fiber reinforced polyphenylene sulphide (PPS); and wherein, on the side of said guide section facing said pressure chamber, said body has a radial groove or a shoulder in or on which a packing ring having a dynamic sealing lip is disposed, said dynamic sealing lip facing away from said pressure chamber.

33. A motor vehicle gearbox according to claim 32, wherein said piston body has one end, said one end having a radial groove into which a plastic ring is inserted, said plastic ring having an outside perimeter which is provided with a plurality of supporting projections interacting with said cylinder bore.

34. A motor vehicle gearbox according to claim 33, wherein said piston body has a second end, said second end having a collar with an outside perimeter which is provided with a plurality of supporting projections interacting with said cylinder bore.

35. A motor vehicle gearbox according to claim 32, wherein said sliding selector shaft is connected to said piston via a clip connection.

36. A motor vehicle gearbox according to claim 35, wherein said piston is provided with a recess to accommodate one end of said sliding selector shaft and has at least one lug at the beginning of said recess, which is engaged in a corresponding recess of said sliding selector shaft.

37. A motor vehicle gearbox according to claim 32, wherein said body is an integral injection molding in plastic.

* * * * *